April 9, 1935. E. B. BOUGHTON ET AL 1,997,100
LIQUID PRESSURE BRAKING MEANS FOR VEHICLES
Filed Aug. 9, 1933
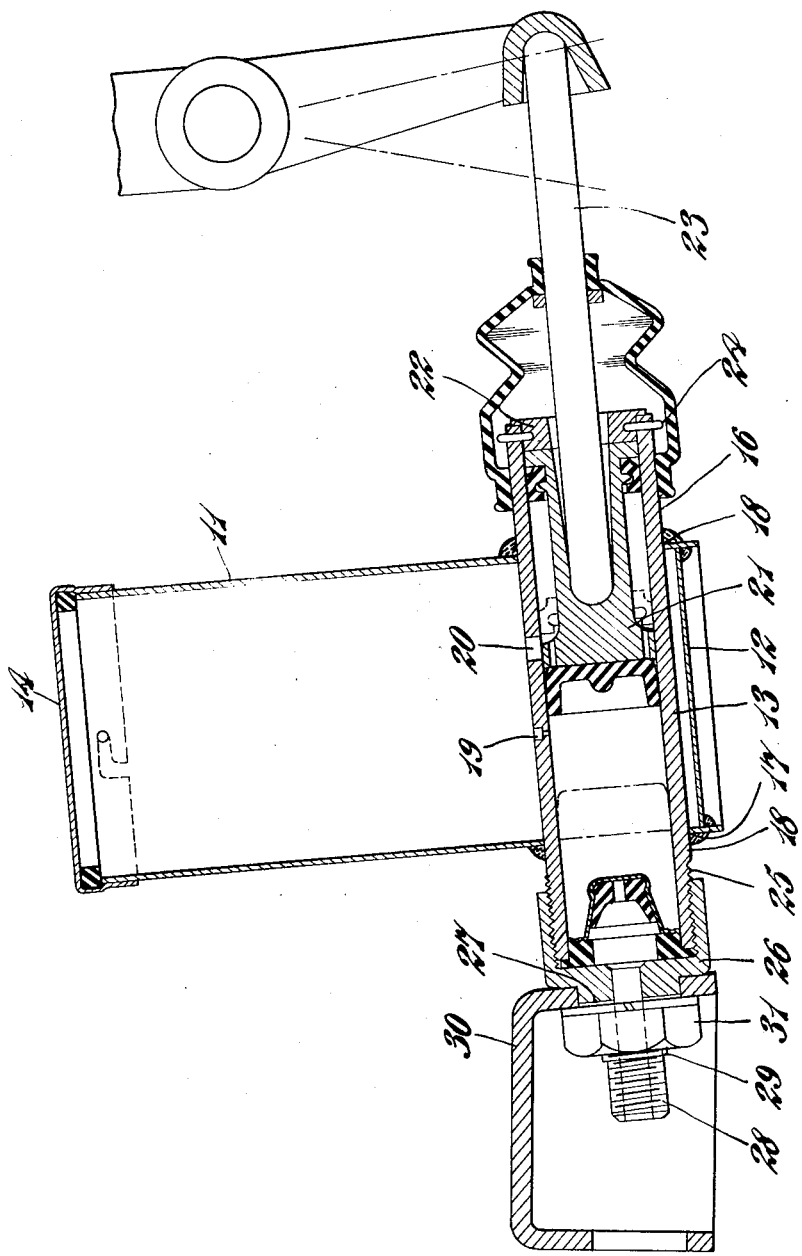
INVENTORS
E. B. BOUGHTON
G. VAN VESTRAUT
ATTY.

Patented Apr. 9, 1935

1,997,100

UNITED STATES PATENT OFFICE 1,997,100

LIQUID PRESSURE BRAKING MEANS FOR VEHICLES

Edward Bishop Boughton, London, and Geoffrey Van Vestraut, Leamington Spa, England, assignors to Lockheed Hydraulic Brake Company Limited, London, England Application August 9, 1933, Serial No. 684,446
In Great Britain October 7, 1932

1 Claim. (Cl. 60—54.6)

This invention relates to liquid pressure braking means for vehicles, and in particular to the master cylinder and piston units thereof, by which pressure is imparted to the operating liquid; the invention having for an object to provide a very simple and inexpensive unit.

According to the invention, a master cylinder and liquid reservoir are constituted each by a metal tube or formed pressing, that comprising the reservoir being larger than that comprising the cylinder, and the latter extending completely through and projecting at each end or side of the reservoir near the lower part thereof.

According to one form of the invention, which is illustrated in the accompanying drawing in side elevation, a reservoir for pressure liquid is in the form of a drawn metal tube 11, which is closed at its lower end by a welded-in metal disc 12 and which has formed at diametrically opposite points in the walls thereof, near to the bottom, two circular holes for receiving a master cylinder 13; a bayonet or other cap 14 being provided at the open end of the reservoir 11 which is to be uppermost. The master cylinder 13 is also comprised by a length of metal tubing, the external diameter of which is equal to that of the two holes formed in the reservoir 11. This tube 13 is inserted through the holes in the reservoir 11 so that it projects, as indicated at 15 and 16, to substantially the same extent at each side of the reservoir 11, and the reservoir 11 and cylinder 13 are then secured together by welding, as indicated at 17 and 18. The master cylinder 13 is formed intermediately of its length with bores 19 and 20 communicating with the interior of the reservoir 11 and has mounted therein a piston 21 of known type. At one end it is provided with a partial closure 22 serving as an abutment against which the piston 21 may be retracted by the usual return spring (not shown), and this ring-like abutment 22, through which a thrust rod 23 for actuating the piston 21 extends, may be in the form of a divided spring ring, or alternatively may be held in position by a similar device such as that indicated at 24. The other end of the master cylinder 13 is threaded externally as at 25, to receive a bored screw cap 26 at the outer side of which extends a boss 27 of a diameter slightly smaller than that of the cylinder 13 itself, from which boss 27 in turn extends a threaded nipple 28 to receive the usual union nut (not shown) fcr affixing a pressure conduit of a braking system to the master cylinder 13, said threaded nipple 28, boss 27 and screw cap 26 being formed integrally. The boss 27 just referred to is formed of reduced diameter for a part of its length, as indicated at 29, to provide a shoulder between said reduced portion and the main body of the cap 26. This reduced portion 29 of the boss 27 is formed with a screw thread, which may, if desired, be a continuation of that of the nipple portion 28 of the screw cap 26.

The device comprised by this assembly of master cylinder and liquid reservoir is intended to be mounted in position upon the chassis of a vehicle, by forming in a support member, which may be an actual chassis member, as indicated at 30, an aperture to take the above-mentioned shoulder of the screw cap 26, the axial thickness of this shoulder being less than the thickness of this support member 30, so that when the nipple end of the screw cap 26 is inserted through the aperture in the support member 30 until the body of the cap 26 abuts against the support member 30 with the shoulder located within the aperture in the latter, a nut 31 may be screwed onto the threaded reduced part 29 of the boss 27 so that the support member 30 is clamped firmly between it and the main body of the screw cap 26. Then the pressure conduit (not shown) is connected by means of a union nut (not shown) with the threaded nipple portion 28 of the cap 26.

It will be observed that a master cylinder and reservoir unit according to the invention will occupy very little space, will be very inexpensive in manufacture, and will be light in weight, requiring little or no special provision in a vehicle for accommodating and supporting it, so that it is particularly adapted for use on motor cars of the smallest types.

What we claim is:—

A combined master cylinder and liquid reservoir unit for use in liquid pressure braking means, comprising a tube of comparatively large diameter, a closure for the upper end of the tube, a disk welded to and forming a closure for the lower end of the tube, a second tube of comparatively small diameter extending diametrically through and beyond the tube of large diameter, the second tube being disposed above and immediately adjacent the disk, said second tube in its length within the tube of large diameter being formed with openings to establish communication between the tubes, a piston operative within the second tube, a cap at one end of the second tube, and an extension from the cap for cooperation with a fixture to provide a rigid sole support for the unit, said cap and extension being perforated longitudinally for the passage of fluid therethrough under the action of the piston.

EDWARD BISHOP BOUGHTON.
GEOFFREY VAN VESTRAUT.